United States Patent [19]
Harada

[11] Patent Number: 5,385,017
[45] Date of Patent: Jan. 31, 1995

[54] APPARATUS FOR CONTROLLING HEATING OF A CATALYTIC CONVERTER OF AN INTERNAL COMBUSTION ENGINE

[75] Inventor: Kenichi Harada, Susono, Japan

[73] Assignee: Toyota Jidosha Kabushiki Kaisha, Toyota, Japan

[21] Appl. No.: 133,293

[22] Filed: Oct. 8, 1993

[30] Foreign Application Priority Data

Oct. 15, 1992 [JP]  Japan ................... 4-277528

[51] Int. Cl.6 ............................................. F01N 3/36
[52] U.S. Cl. ......................................... 60/284; 60/286; 60/300; 60/303; 123/424
[58] Field of Search ................. 60/284, 285, 286, 300, 60/303; 123/424

[56] References Cited

U.S. PATENT DOCUMENTS

| | | | |
|---|---|---|---|
| 3,732,696 | 5/1973 | Masaki | 60/284 |
| 4,111,010 | 9/1978 | Minami | 60/284 |
| 4,351,297 | 9/1982 | Suematsu | 123/424 |
| 5,184,463 | 2/1993 | Becker et al. | 60/284 |
| 5,263,318 | 11/1993 | Oota | 60/286 |

FOREIGN PATENT DOCUMENTS

| | | | |
|---|---|---|---|
| 54-13820 | 1/1979 | Japan | 60/284 |
| 55-32941 | 8/1980 | Japan | . |
| 58-210311 | 12/1983 | Japan | 60/284 |
| 60-145278 | 9/1985 | Japan | . |

Primary Examiner—Ira S. Lazarus
Assistant Examiner—Daniel J. O'Connor
Attorney, Agent, or Firm—Oliff & Berridge

[57] ABSTRACT

A catalyst heating control apparatus includes a catalytic converter arranged in an exhaust passage of an internal combustion engine, a heating part for heating a catalyst of the catalytic converter after the engine has started operating so as to promote a catalytic conversion of exhaust gas from the engine, a detecting part for sensing a temperature of engine coolant of the engine and a calculating part for determining a releasing condition based on an engine temperature sensed by the detecting part at the start of the engine operation. The heating of the catalyst of the catalytic converter is stopped when the releasing condition is satisfied. A stopping part stops the heating part from heating the catalyst of the catalytic converter when an operating condition of the engine satisfies the releasing condition.

11 Claims, 15 Drawing Sheets

APPARATUS FOR CONTROLLING HEATING OF A CATALYTIC CONVERTER OF AN INTERNAL COMBUSTION ENGINE

BACKGROUND OF THE INVENTION

1. Field of the Invention

The present invention generally relates to a catalyst heating control apparatus, and more particularly to an apparatus for controlling heating of a catalytic converter of an internal combustion engine in order to achieve an efficient catalytic conversion of exhaust emission of the engine.

2. Description of the Related Art

Generally, a catalytic converter of an internal combustion engine does not achieve an efficient catalytic conversion of exhaust gas from the engine when the catalyst temperature is lower than a catalyst activation temperature (hereinafter called a target temperature). The catalyst of the catalytic converter is heated by the exhaust gas during the engine operation so that the catalyst temperature is increased by the heat of the exhaust gas to the target temperature.

However, when the engine has just started operating under a cold start condition, the engine is not yet warmed up and the engine combustion efficiency is low. The temperature of exhaust gas at such a time is low, and the catalytic conversion efficiency relating to the catalyst subjected to the exhaust gas in the cold start condition becomes very low.

In order to eliminate the above mentioned problem and achieve an efficient catalytic conversion of exhaust gas, it is necessary to predict the temperature of the catalyst from the operating condition of the engine. Japanese Laid-Open Utility Model Publication No. 60-145278 discloses a catalyst heating control device of an internal combustion engine in which the catalyst temperature is predicted from an engine cooling water temperature sensed from the engine. Hereinafter, the temperature of engine cooling water of the engine is called the engine temperature. In the conventional device disclosed in the above mentioned publication, no consideration is given as to the engine temperature at which the engine started operating.

In the conventional device disclosed in the above mentioned publication, if the sensed engine temperature is below a fixed reference temperature, it is determined that the catalyst temperature is below the target temperature. Thus, the catalyst of the catalytic converter at this time is heated by setting up a delayed ignition time condition in which an ignition time relating to a spark plug of the engine is delayed. On the other hand, if the sensed engine temperature is higher than the fixed reference temperature, it is determined that the catalyst temperature is higher than the target temperature. Thus, the catalyst of the catalytic converter at this time is released from the heating due to the ignition timing delay, so that the catalyst is heated by the heat of the exhaust gas.

FIG. 1 shows the operation of the conventional device disclosed in the above mentioned publication. When the engine has started operating at a normal temperature (e.g., 0 deg. C.), the engine temperature indicated by a line Ia in FIG. 1 begins to increase towards a fixed reference temperature THWo (e.g., 50 deg. C.). When the engine temperature reaches the reference temperature THWo, the catalyst temperature indicated by a line IIa in FIG. 1 is actually equal to a target catalyst temperature To (e.g., 300 deg. C.). Thus, if the catalyst of the catalytic converter is released from the heating due to the ignition time delay when the engine temperature (the engine cooling water temperature) reaches the fixed reference temperature THWo, the catalyst is heated by the heat of the exhaust gas in a manner suitable for achieving an efficient catalytic conversion of the exhaust gas.

However, when the engine has started operating at a very low temperature (e.g., −50 deg. C.), it takes a longer time for the engine temperature to rise to the reference temperature THWo. It is difficult to correctly predict the catalyst temperature from the sensed engine temperature (the temperature of engine cooling water). Changes of the engine temperature and the catalyst temperature after the starting of the engine operation are indicated by lines Ib and IIb in the timing chart in FIG. 1. When the engine temperature has reached the reference temperature THWo, the catalyst temperature has become much higher than the target temperature To. Thus, if the catalyst is released from the heating due to the ignition time delay when the engine temperature reaches the fixed reference temperature THWo, it is likely that the catalyst deteriorates or is damaged by the heat excessively supplied thereto in the delayed ignition time condition.

In addition, in the case of the conventional device indicated by the lines Ib and IIb in FIG. 1, there is a problem in that the fuel economy becomes worse since the catalyst is heated for an extended duration before the catalyst is released from the heating. When the engine is operating under the delayed ignition time condition, the output power of the engine becomes smaller than the output power when the engine is operating under a non-delayed ignition time condition. In order to obtain the desired output power of the engine under the delayed ignition time condition, it is necessary to set the throttle valve to a throttle angle greater than the throttle angle set under the non-delayed condition. In addition, it is necessary to inject, under the delayed condition, a greater amount of fuel into the intake passage of the engine than the amount of fuel injected under the non-delayed condition. Therefore, the fuel economy becomes worse when the engine starts operating under a cold start condition. In the timing chart in FIG. 1, "a" and "b" indicate changes of an execution flag (used to allow the heating or non-heating of the catalyst) when the starting engine temperature is normal and when the starting engine temperature is very low.

SUMMARY OF THE INVENTION

Accordingly, it is a general object of the present invention to provide an improved catalyst heating control apparatus in which the above described problems are eliminated.

Another, more specific object of the present invention is to provide a catalyst heating control apparatus which suitably controls the heating of a catalytic converter by setting a releasing condition based on an engine temperature sensed at the starting of the engine operation. A determination as to how the catalytic converter is released from the heating is based on the releasing condition.

The above mentioned objects of the present invention are achieved by a catalyst heating control apparatus which includes a catalytic converter arranged in an exhaust passage of an internal combustion engine, a heating part for heating a catalyst of the catalytic converter after the engine has started operating so as to promote catalytic conversion of exhaust gas from the engine, a detecting part for sensing a temperature of engine coolant, a calculating part for determining a releasing condition based on an engine coolant temperature sensed by the detecting part at the start of the engine operation, the catalyst of the catalytic converter being released from the heating by the heating part when the releasing condition determined by the calculating part is satisfied, and a releasing part for prohibiting the heating part from heating the catalyst of the catalytic converter when the releasing part detects that an operating condition of the engine satisfies the releasing condition.

According to the present invention, a releasing condition is determined based on the engine temperature sensed at the start of the engine operation. The releasing condition varies depending on the engine temperature at the start of engine operation. The correct catalyst temperature is predicted, and the reference point at which the heating of the catalyst is stopped is suitable determined so that the catalyst is not overheated. Thus, the catalyst is heated in a manner appropriate for efficient catalytic conversion of exhaust gas even when the engine starts operating under a cold start condition.

BRIEF DESCRIPTION OF THE DRAWINGS

The above and other objects, features and advantages of the present invention will become apparent from the following detailed description when read in conjunction with the accompanying drawings in which.

DESCRIPTION OF THE PREFERRED EMBODIMENTS

A description will now be given of a preferred embodiment of the catalyst heating control apparatus according to the present invention.

Figure 1:
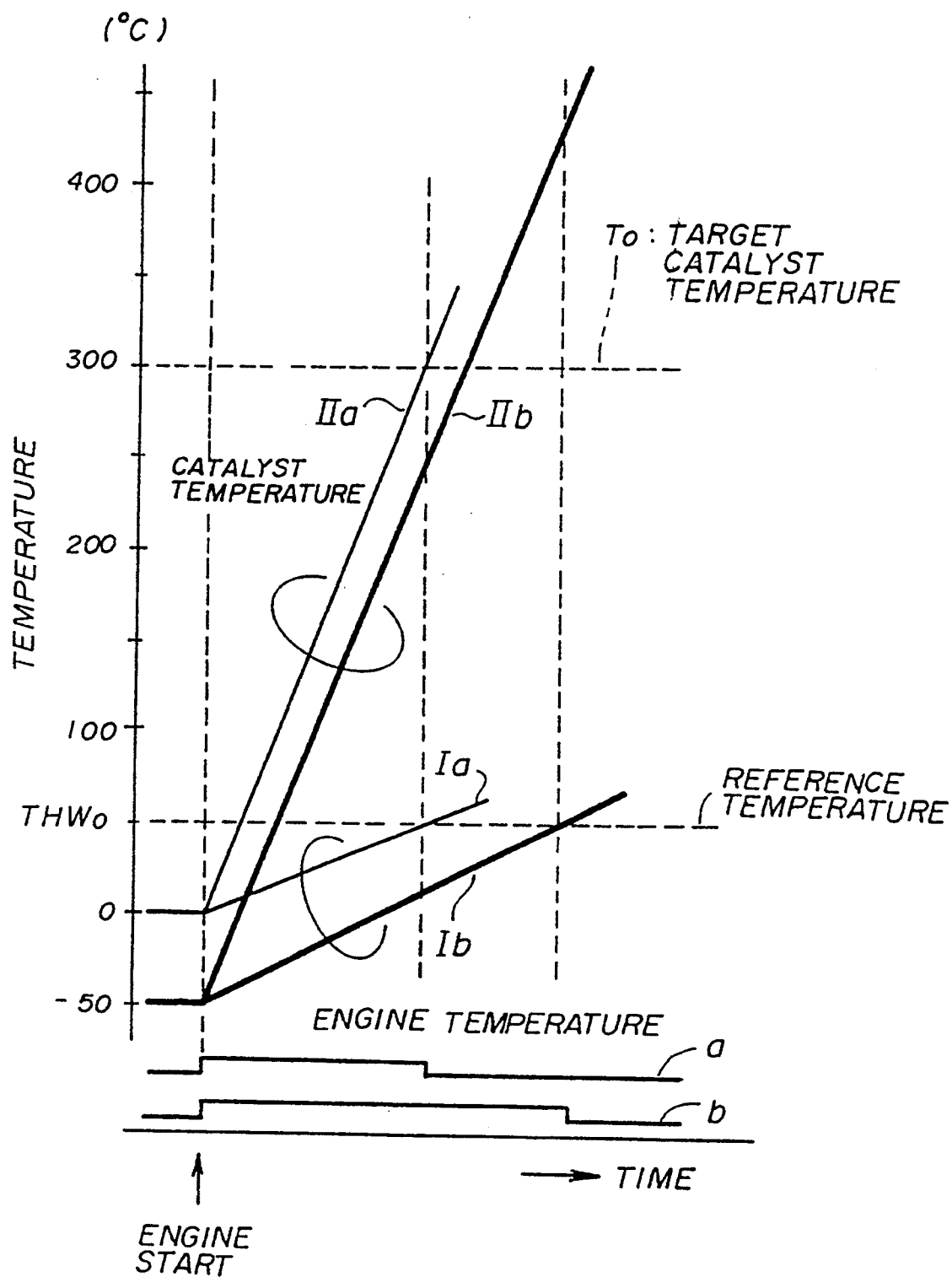
FIG. 1 is a timing chart for explaining the operation of a conventional catalyst heating control device.
Figure 2:
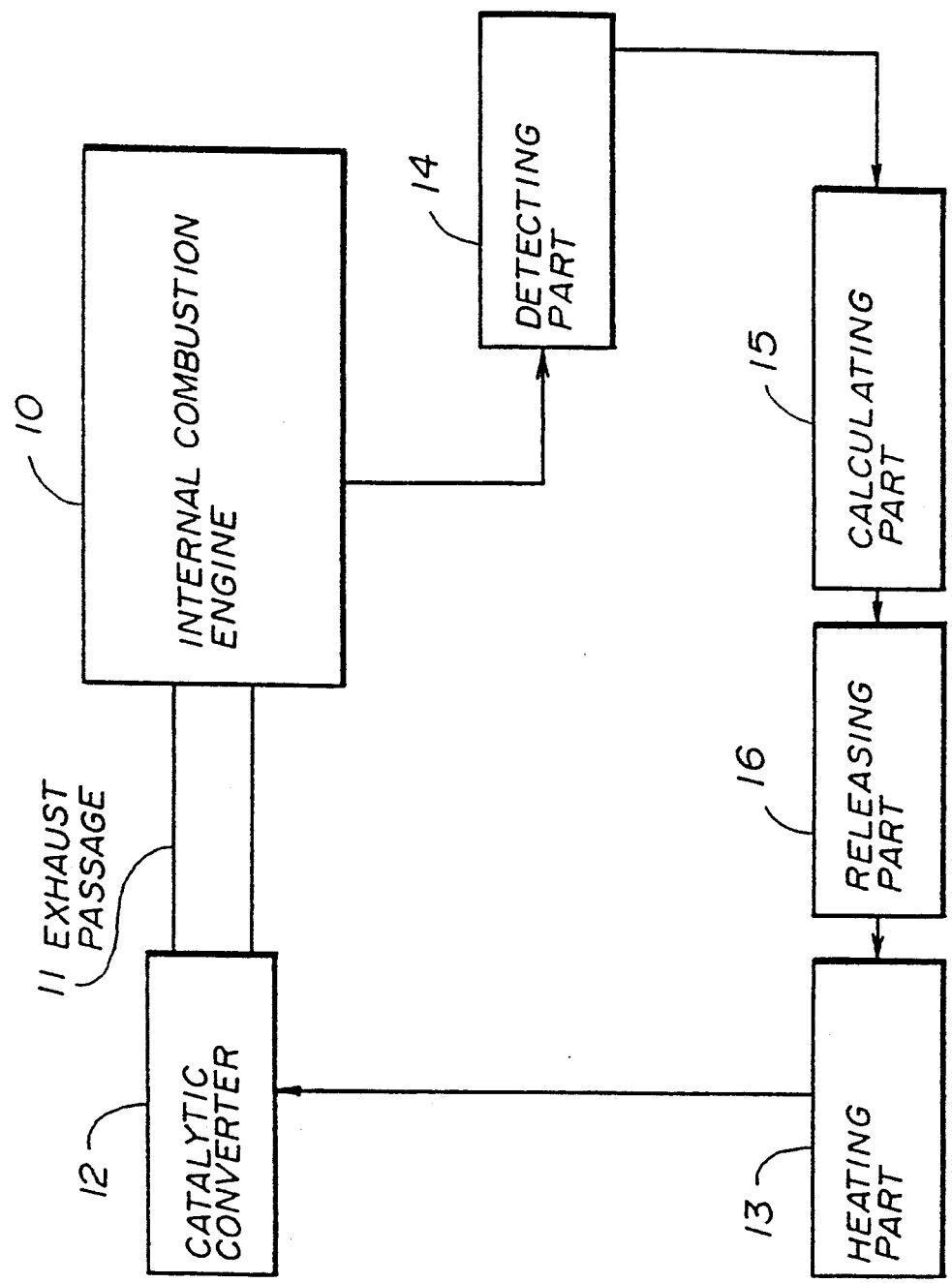
FIG. 2 is a block diagram showing an embodiment of a catalyst heating control apparatus according to the present invention.

FIG. 2 schematically shows an embodiment of the catalyst heating control apparatus according to the present invention. In FIG. 2, the catalyst heating control apparatus includes a catalytic converter 12 arranged in an exhaust passage 11 of an internal combustion engine 10 for performing a catalytic conversion of exhaust gas from the engine. A heating part 13 heats a catalyst of the catalytic converter 12 after the engine 10 has started operating so as to promote the catalytic conversion of exhaust gas from the engine. A detecting part 14 senses a temperature of engine coolant of the engine 10. A calculating part 15 determines a releasing condition based on an engine temperature sensed by the detecting part 14 at the start of the engine operation. The heating of the catalyst of the catalytic converter by the heating part 13 is stopped when the releasing condition determined by the calculating part 15 is satisfied. A releasing part 16 prohibits the heating part 13 from heating the catalyst of the catalytic converter when the releasing part 16 detects that an operating condition of the engine satisfies the releasing condition.

Figure 3:
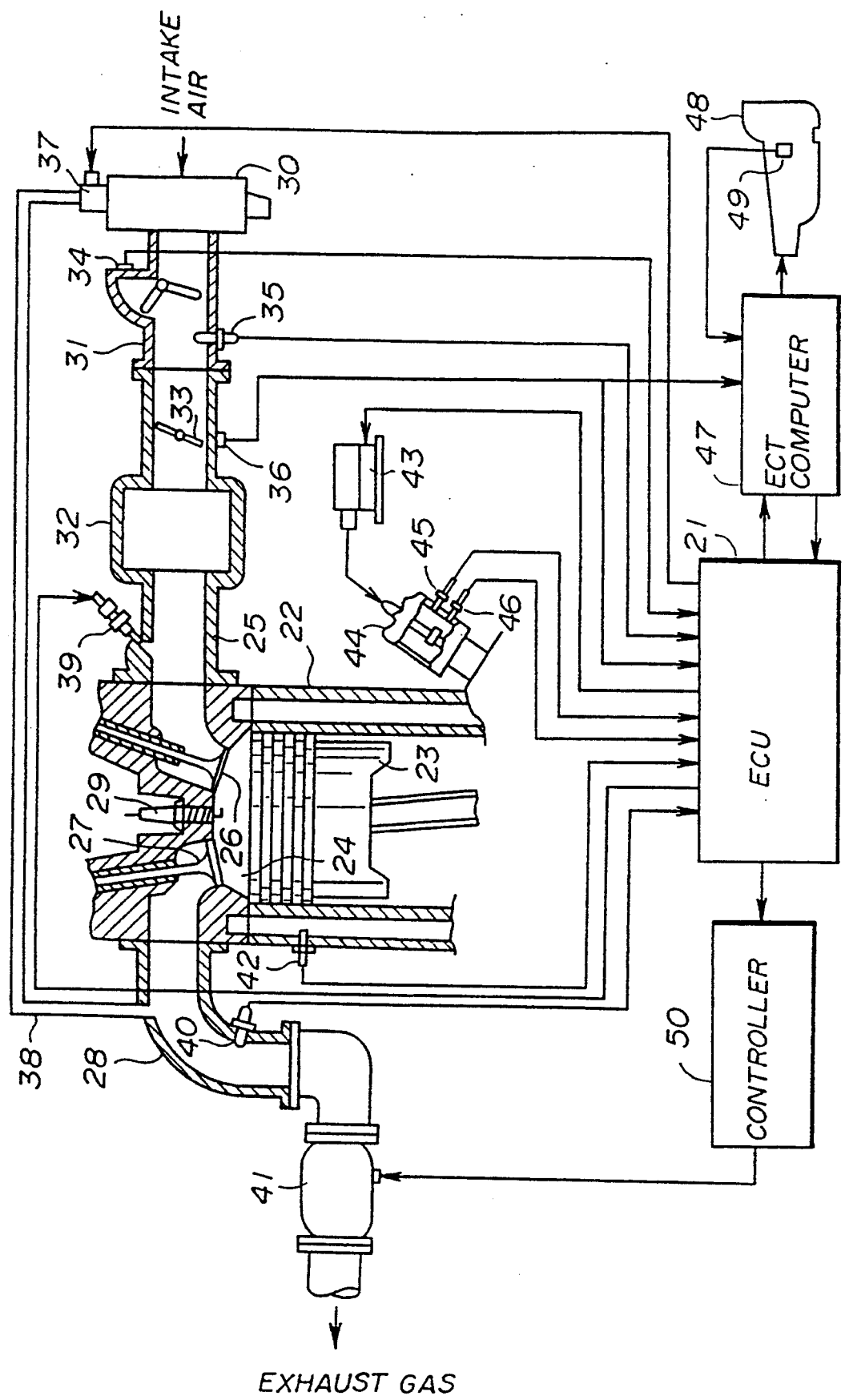
FIG. 3 is a system diagram showing a system of an internal combustion engine to which the present invention is applied.

Next, a description will be given, with reference to FIG. 3, of a system of an internal combustion engine to which the present invention is applied. In FIG. 3, the internal combustion engine is a four-cylinder, spark-ignition engine. For the sake of convenience, only one cylinder among the four cylinders of the engine is shown and the other cylinders are not shown. The operations of component parts of the system in FIG. 3 are controlled by signals supplied from an electronic control unit (ECU) 21 to the respective parts.

In the engine shown in FIG. 3, a piston 23 is arranged in an engine block 22 such that the piston 23 moves up and down in the cylinder during the operation of the engine. A combustion chamber 24 communicates with an intake manifold 25 via an intake valve 26, and the combustion chamber 24 communicates with an exhaust manifold 28 via an exhaust valve 27. A spark plug 29 is arranged on top of the combustion chamber 24, and a leading edge (where a plug gap is formed) of the spark plug 29 projects into the combustion chamber 24.

Intake air enters an intake pipe 31 from an air cleaner 30 arranged at an inlet of the intake pipe 31, and the air cleaner 30 serves to remove dusts or foreign matter from the intake air. The intake pipe 31 communicates with the intake manifold 25 via a surge tank 32. In the intake pipe 31, a throttle valve 33 and an air flow meter 34 are arranged. The flow rate of intake air passing through the intake pipe 24 is measured by the air flow meter 34. The flow of intake air is controlled by the throttle valve 33. The throttle valve 25 is set to a throttle angle according to the position of an accelerator pedal (not shown) set by an vehicle operator. This throttle angle of the throttle valve 33 is sensed by a throttle position sensor 36, and this sensor is arranged in the intake pipe 31 near the throttle valve 33. An intake air temperature sensor 35 is arranged in the intake pipe 31 downstream of the air flow meter 34, and the temperature of intake air passing through the air flow meter 34 is sensed by the intake air temperature sensor 35. A secondary air control valve 37 is arranged at a portion of the air cleaner 30, and this valve valve 37 communicates with the exhaust manifold 28 via an air passage 38 for sending air to the exhaust manifold 28.

A fuel injection valve 39 is arranged in the intake manifold 25, and the fuel injection valve 39 partially projects into the intake manifold 25. During a fuel injection phase determined by a control signal supplied from the ECU 21, the fuel injection valve 39 injects fuel (supplied from a fuel tank through a fuel supply pipe) to the inside of the intake manifold 25 so that the fuel is mixed with the intake air passing through the intake manifold 25 to make a mixture with an appropriate air-fuel ratio. An oxygen sensor 40 is arranged in the exhaust manifold 28, and the oxygen sensor 40 partially projects into the exhaust manifold 28. The concentration of oxygen gas in exhaust gas passing through the exhaust manifold 28 is sensed by the oxygen sensor 40.

The exhaust manifold 28 of the engine is connected to an exhaust pipe (leading to the atmosphere) through an electrically heatable catalytic (EHC) converter 41. A coolant water temperature sensor 42 is arranged in the engine block 22, and this sensor 42 partially projects into a water jacket of the engine. The temperature of engine cooling water of the engine is sensed by the water temperature sensor 42.

An igniter 43 is connected to the ECU 21 such that the igniter 43 allows an ignition coil (not shown) to conduct a primary current in accordance with a signal supplied from the ECU 21 to the igniter 43. A distributor 44 is connected to the igniter 43 to supply high voltage, derived from the primary current of the ignition coil, to a spark plug 29 at the engine cylinder in accordance with a signal supplied from the ECU 21. A cylinder discriminating sensor 45 and a rotation angle sensor 46 are arranged in the distributor 44, and both sensors are connected to the ECU 21. Based on the rotation of the rotating shaft of the distributor 44, the cylinder discriminating sensor 45 generates a signal indicating a reference position of the engine crankshaft when the engine crankshaft rotates during the operation of the engine. In addition, the rotation angle sensor 46 generates a signal indicating the engine speed every 30 degrees (the crank angle) when the engine crankshaft rotates.

When the signals output from the ECU 21 are supplied to the fuel injection valve 39, the igniter 43 and the other parts, necessary data signals are transferred to an ECT (electronically controlled transmission) computer 47. The ECT computer 47 is a control unit for controlling the operation of an automatic transmission 48, and is made up of a microcomputer. In addition to the data signals supplied from the ECU 21 to the ECT computer 47, other signals are input to the ECT computer 47, and these signals include: a vehicle speed signal sensed by a vehicle speed sensor (not shown) from the rotation of the output shaft of the vehicle; a shift position signal sensed by a shift position switch 49 from the automatic transmission 48; and a throttle angle signal sensed by the throttle position sensor 36. The ECT computer 47 performs calculations relating to determination of a shift pattern of the automatic transmission 48 based on the input signals mentioned above, and supplies a control signal to the automatic transmission 48 so that a shifting control operation is performed by the control signal.

Figure 4:
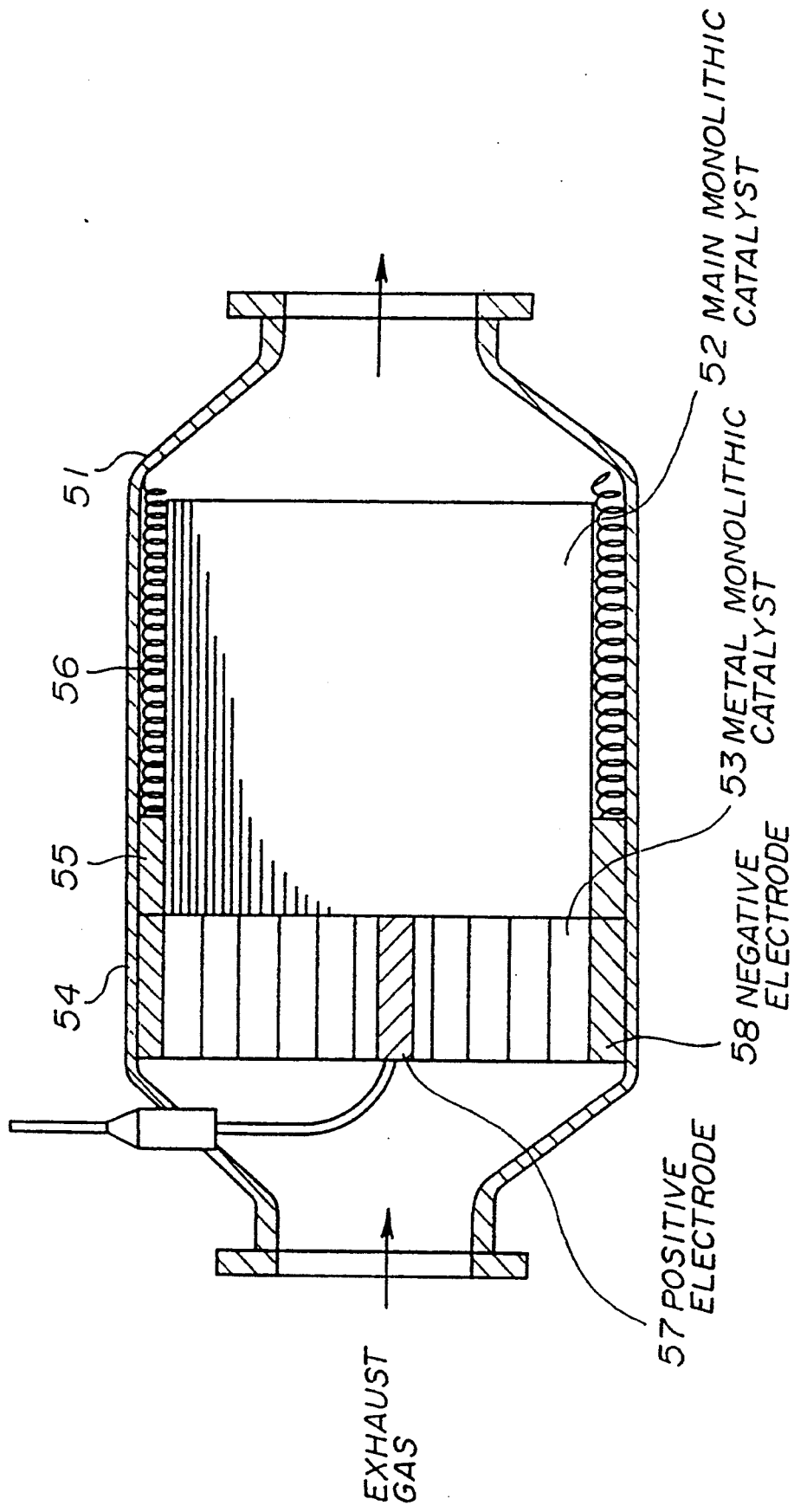
FIG. 4 is a sectional view showing a longitudinal cross section of an electrically heatable catalytic converter of the system in FIG. 3.

In FIG. 4, a positive electrode 57 arranged along the central axis of the EHC converter 41 is connected to the ECU 21 via a controller 50. A negative electrode 58 of the EHC converter 41 is formed integrally with an outer peripheral case 51 of the EHC converter 41. In accordance with a signal supplied from the ECU 21 to the controller 50, the controller 50 allows electric voltage to be applied between the positive and negative electrodes 57 and 58 so that a catalyst of the EHC converter 41 is heated.

Figure 5:
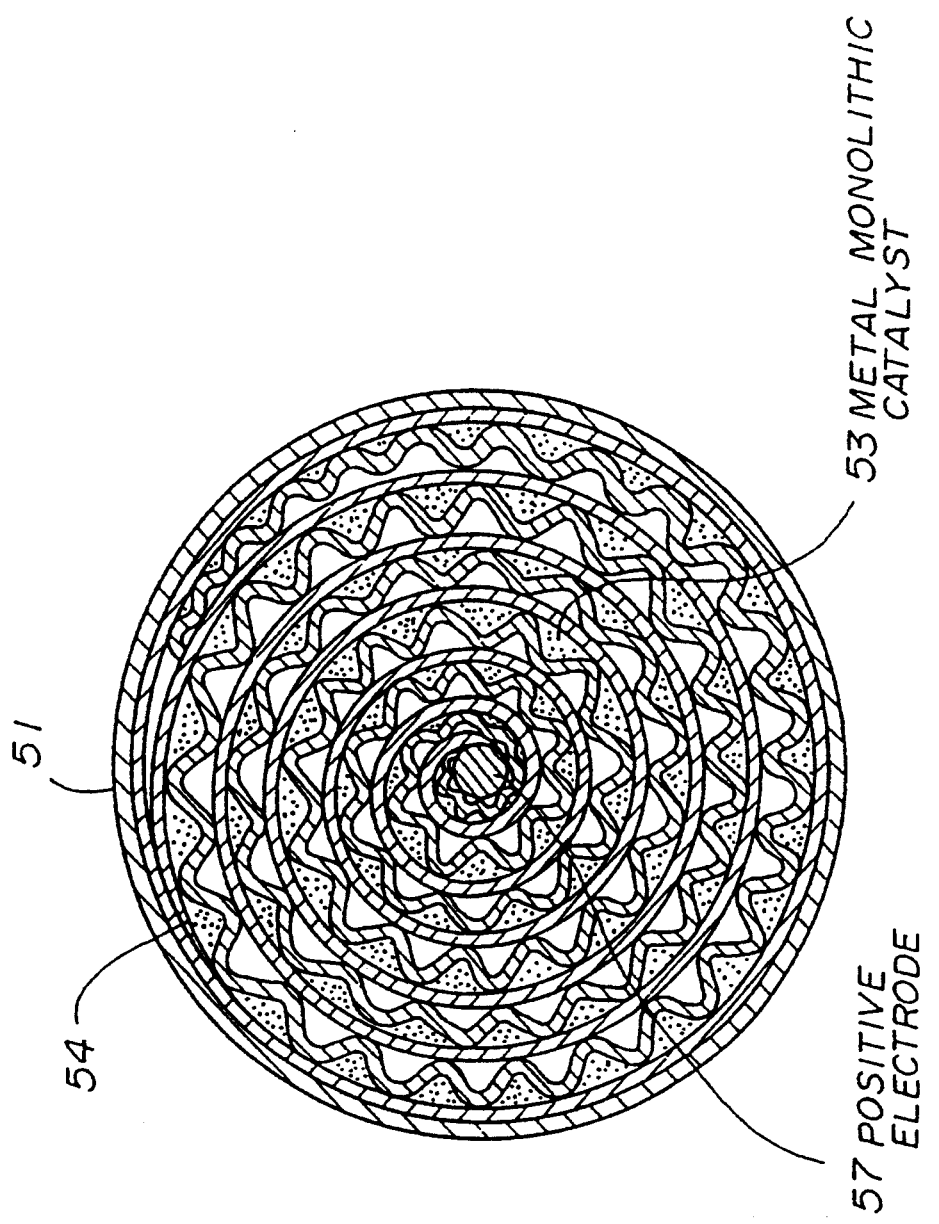
FIG. 5 is a sectional view showing a lateral cross section of the electrically heatable catalytic converter shown in FIG. 4.

An electrically heatable catalytic (EHC) converter which is disclosed in Japanese Laid-Open Utility Model Publication No. 63-67609 (assigned to the applicant of the present invention) is applied to the system shown in FIG. 3. FIGS. 4 and 5 respectively show a longitudinal cross section and lateral cross section of the EHC converter disclosed in the above mentioned publication.

The EHC converter shown in FIGS. 4 and 5 generally has the outer peripheral wall 51, a main monolithic catalyst 52, and a metal monolithic catalyst 53. The main monolithic catalyst 52 is formed with catalytic elements and a honeycombed, ceramic-material monolithic carrier. The main monolithic catalyst 52 and the metal monolithic catalyst 53 are arranged in series in the direction in which the exhaust gas passes through along the longitudinal axis of the EHC converter.

The metal monolithic catalyst 53 in FIGS. 4 and 5 is formed with catalytic elements and a honeycombed, gamma-alumina-coated metal monolithic carrier. The metal monolithic catalyst 53 is an electrically heatable element of the EHC converter 41. The outer periphery of the metal monolithic catalyst 53 is protected by a metallic case 54 arranged inside the case 51. A seal 55 adjacent to the to metallic case 54 is arranged at an upstream portion of the main monolithic catalyst 52 inside the case 51. A wire-netting cushion 56 is arranged at a downstream portion of the main monolithic catalyst 52 inside the case 51. The metallic case 54 and the positive and negative electrodes 57, 58 extend along the longitudinal axis of the EHC converter 41 to an extent of the width of the metal monolithic catalyst 53 as shown in FIG. 4.

When the electric voltage between the positive and negative electrodes 57 and 58 is applied by the controller 50, the metal monolithic catalyst 53 of the EHC converter 41 is heated, so that the temperature of the catalyst 53 rises to the catalyst activation temperature. The temperature of exhaust gas entering the main monolithic catalyst 52 is increased by the heat of the catalyst 53. Thus, the amount of hydrocarbon (HC) and carbon monoxide (CO) included in the exhaust gas is reduced due to the catalytic conversion by the metal monolithic catalyst 53 and the main monolithic catalyst 52.

The controller 50 is made up of a control circuit connected to the ECU 21, a switching transistor relay and a current sensor. A voltage from a storage battery (not shown) of the vehicle is applied to a collector of the switching transistor relay, and an emitter of the switching transistor relay is connected to the metal monolithic catalyst 53 via the current sensor.

The functions of the calculating part 15 and the releasing part 16 of the catalyst heating control apparatus according to the present invention in FIG. 2 are achieved by the software processing of the ECU 21. The heating part 13 according to the present invention comprises the controller 50, and the detecting part 14 comprises the coolant temperature sensor 42. The catalytic converter 12 according to the present invention is not limited to the electrically heatable catalytic converter 41, and a catalytic converter of another type is applicable to the apparatus of the present invention.

Figure 6:
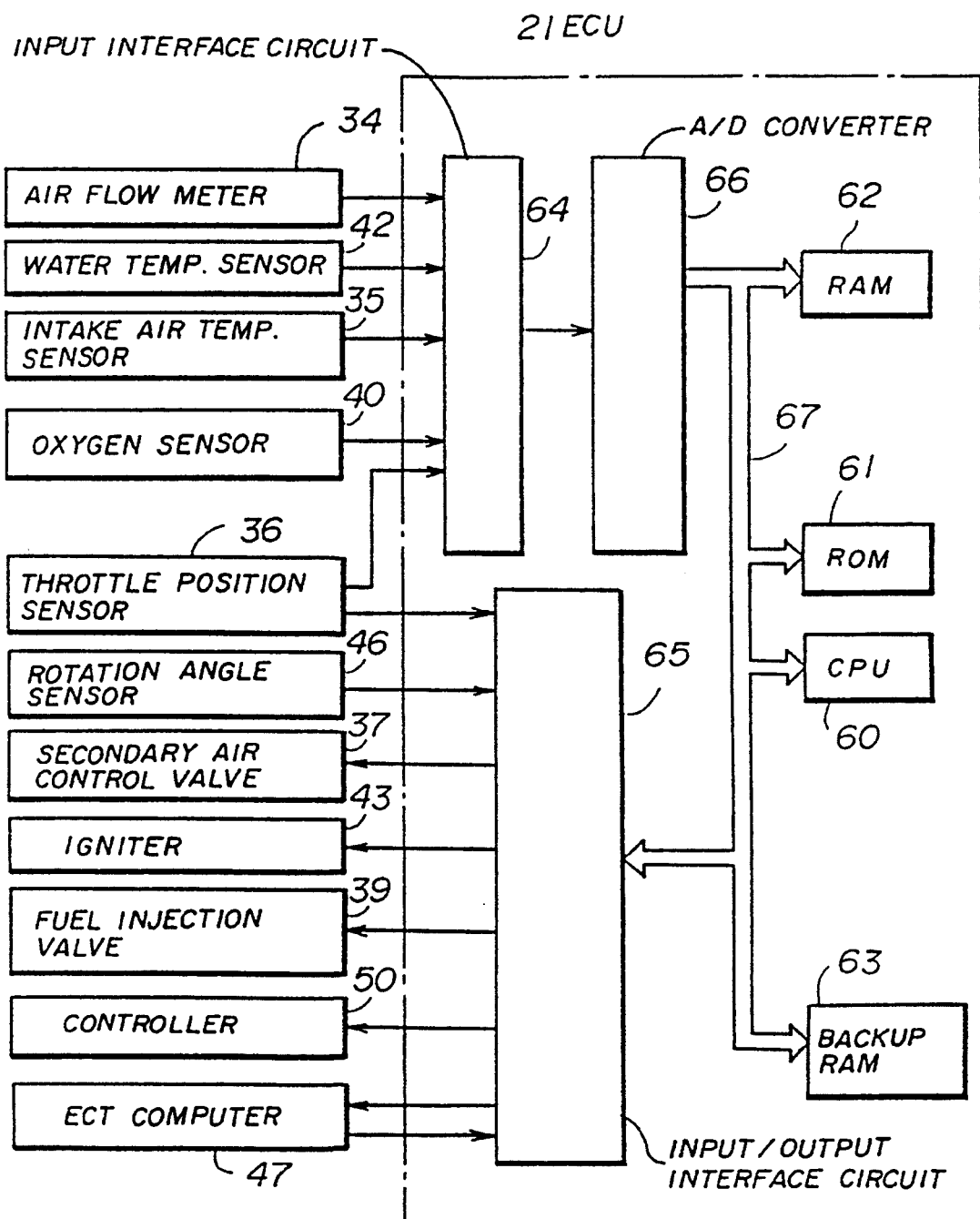
FIG. 6 is a block diagram showing an electronic control unit of the system shown in FIG. 3.

FIG. 6 shows a detailed structure of the ECU 21 in FIG. 3. In FIG. 6, the parts which are the same as corresponding parts shown in FIG. 3 are designated by the same reference numerals, and a description thereof will be omitted. As shown in FIG. 6, the ECU 21 includes a central processing unit (CPU) 60, a read only memory (ROM) 61, a random access memory (RAM) 62, a backup RAM 63, an input interface circuit 64, an input/output interface circuit 65, and an analog-to-digital (A/D) converter 66 coupled to the input interface circuit 64. These component parts of the ECU are interconnected by a system bus 67 as shown in FIG. 6.

The ROM 61 in FIG. 6 stores control programs and parameters used by the CPU 60 when a releasing condition determining procedure according to the present invention is performed. The RAM 62 is used as a work area by the CPU 60 when the above mentioned procedure is performed. The backup RAM 63 retains necessary data after the engine stops operating. A signal indicating an intake air flow rate sensed by the air flow meter 34, a signal indicating an oxygen gas concentration sensed by the oxygen sensor 40, a signal indicating an engine coolant temperature sensed by the coolant temperature sensor 42, a signal indicating an intake air temperature sensed by the intake air temperature sensor 35, and a signal indicating a throttle angle sensed by the throttle position sensor 36 are supplied to the input interface circuit 64. These input signals are processed in a parallel manner by the input interface circuit 64, and a sequence of processed signals of the above mentioned sensors is supplied from the input interface circuit 64 to the A/D converter 66. The processed signals of the sensors are converted by the A/D converter 66 into digital signals, and the digital signals are sequentially transferred from the A/D converter 66 to the system bus 67.

The signal indicating the throttle angle sensed by the throttle position sensor 36, and a signal indicating a crankshaft rotation angle (from which an engine speed NE is derived) sensed by the rotation angle sensor 46 are supplied to the input/output interface circuit 65, and these signals are sent from the input/output interface circuit 65 to the system bus 67. On the other hand, the CPU 60 produces several control signals based on the input signals supplied from the above mentioned sensors. One of these control signals supplied from the CPU 60 to the input/output interface circuit 65 via the system bus 67 is selected by the input/output interface circuit 65, and the control signal selected is transferred from the input/output interface circuit 65 to the secondary air control valve 37, the igniter 43, the fuel injection valve 39, or the controller 50. Thus, the operations of the above mentioned component parts of the system in FIG. 3 are controlled in accordance with the control signals supplied from the ECU 21.

Figure 7:
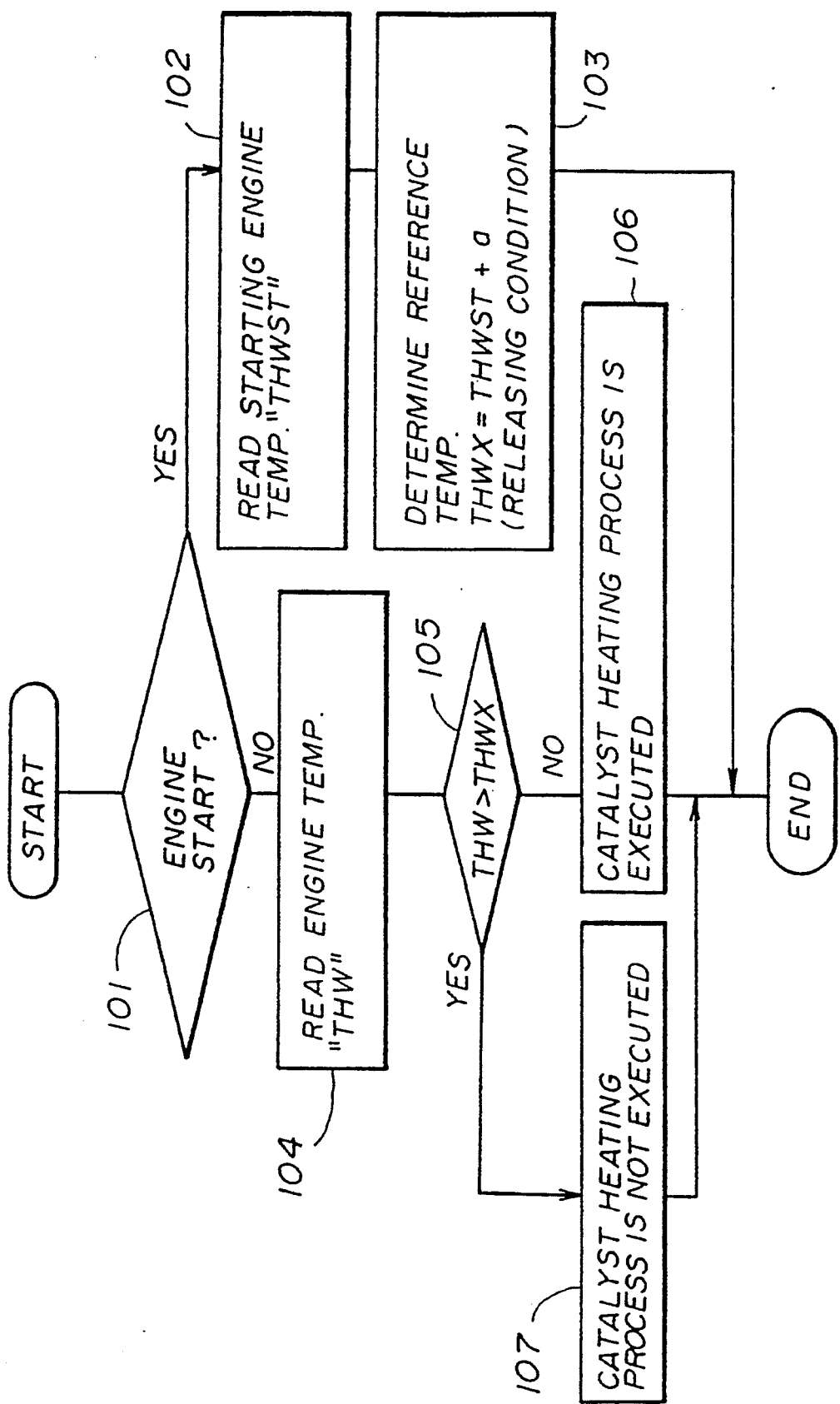
FIG. 7 is a flow diagram for explaining a procedure for determining a releasing condition based on an engine temperature sensed at the start of the engine operation.

Next, a description will be given, with reference to FIGS. 7 to 9, of a releasing condition determining procedure performed by the ECU 21 of the system in FIG. 3. FIG. 7 shows the procedure for determining a releasing condition based on an engine coolant temperature sensed at the start of the engine operation.

The procedure shown in FIG. 7 is repeatedly executed by the ECU 21 using an interrupt function at given time intervals (e.g., 1.0 second). When the releasing condition determining procedure in FIG. 7 is started, step 101 detects whether or not it is currently the time the engine starts operating. This detection is performed based on whether or not a starter signal is supplied to the ECU 21. If step 101 detects that the engine has just started operating, step 102 reads a starting engine temperature THWST based on a signal indicating the engine temperature (the temperature of engine coolant) sensed by the coolant temperature sensor 42 at the start of the engine operation.

After step 102 is performed, step 103 determines a reference temperature THWX by adding a temperature factor "a" to the starting engine temperature THWST (THWX=THWST+a). After step 103 is performed, the procedure in FIG. 7 is temporarily finished. The reference temperature THWX determined in step 103 is a releasing condition on which a determination as to whether the catalyst is to be released from being heated by the controller 50 is based. The temperature factor "a" used in step 103 may be calculated in accordance with the formula: $a=(70-THWST)/1.8$ ($a \geq 0$). Alternatively, it is possible that a map defining the relationship between the starting engine temperature THWST and the temperature factor "a" is stored in the ROM 61, and a value of the temperature factor "a" corresponding to a specific starting engine temperature THWST (obtained in step 102) is retrieved by the CPU 60 from the ROM 61.

Figure 8:
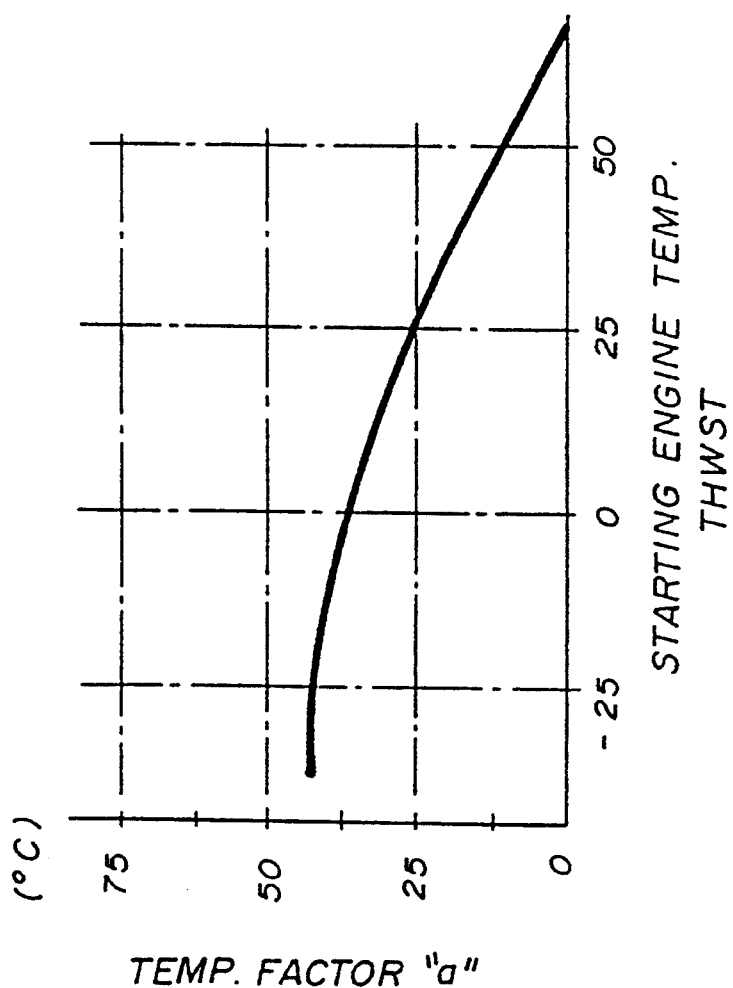
FIG. 8 is a chart showing the relationship between the starting engine temperature and the temperature factor used by the procedure shown in FIG. 7.

FIG. 8 shows the relationship between the starting engine temperature THWST and the temperature factor "a". As indicated in FIG. 8, the value of the temperature factor "a" corresponding to the starting engine temperature THWST becomes smaller in response to the increase of the starting engine temperature THWST. The starting engine temperature THWST sensed at the start of the engine operation can correctly indicate the actual catalyst temperature at that time. In order to achieve efficient catalytic conversion of the exhaust gas, it is necessary to make the time duration in which the catalyst is heated by the controller 50 longer when the catalyst is at a lower temperature.

If step 101 detects that it is not currently the time the engine starts operating, step 104 is performed. In step 104, the CPU 60 reads an engine temperature THW based on a signal indicating the engine temperature sensed by the coolant temperature sensor 42 at that time. After step 104 is performed, step 105 detects whether the engine temperature THW obtained in step 104 is higher than the reference temperature THWX determined in step 103. If THW$\leq$THWX, step 106 is performed. In step 106, the CPU 60 executes a catalyst heating process by setting an execution flag (used to allow the heating of the catalyst) to 1.

The above described catalyst heating process is applied to an ignition time delaying procedure, a shift condition selecting procedure, a secondary air control valve on/off procedure, and an EHC converter on/off procedure. These procedures will be described later.

If step 105 detects that the engine temperature THW is higher than the reference temperature THWX (THW>THWX), step 107 is performed. In step 107, the CPU 60 does not execute the catalyst heating process by resetting the execution flag to zero, so that the catalyst of the EHC converter 41 is no longer heated by the controller 50. The procedure in FIG. 7 is then finished.

Figure 9:
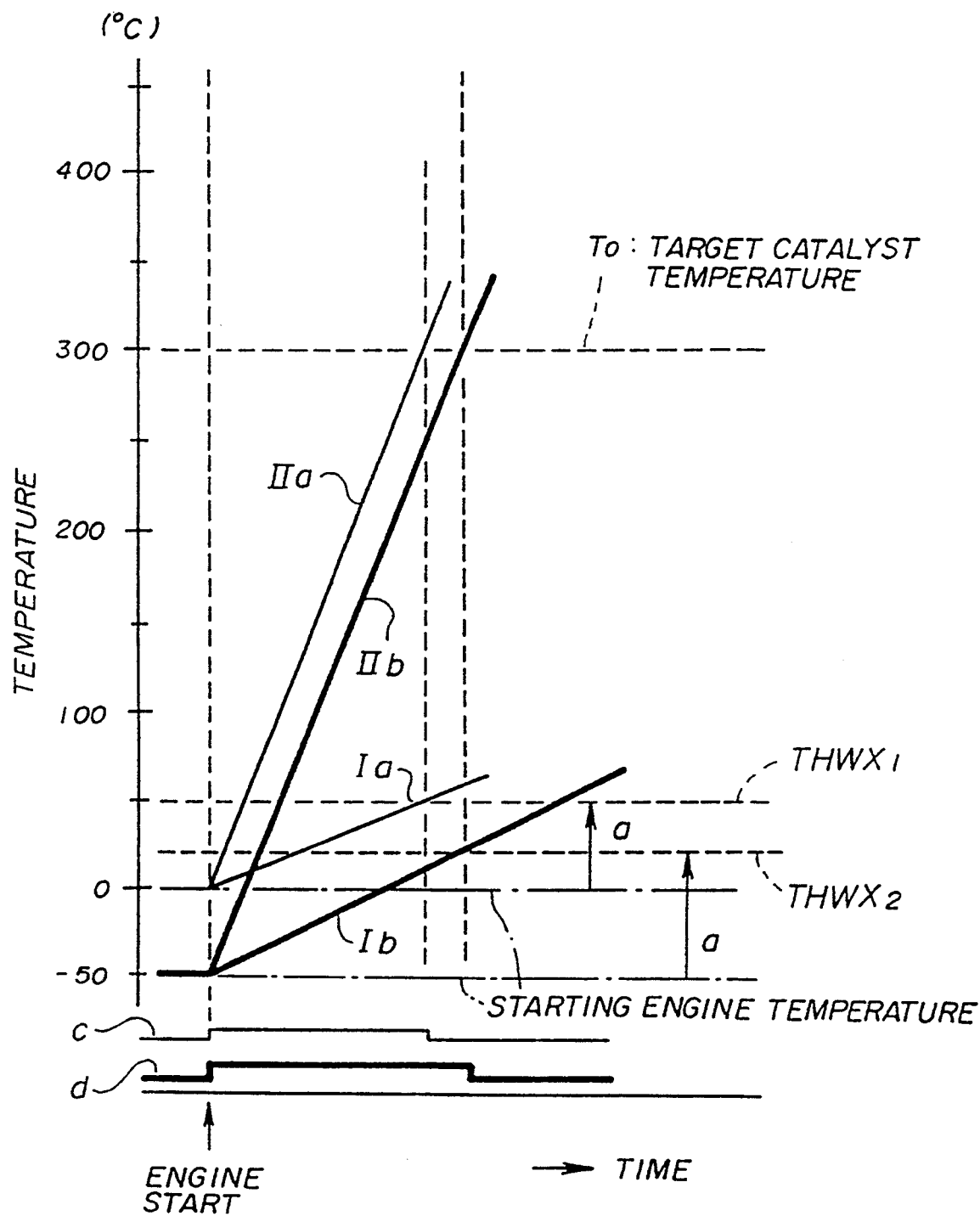
FIG. 9 is a timing chart for explaining the operation of the catalyst heating control apparatus according to the present invention.

FIG. 9 shows the operation of the catalyst heating control apparatus according to the present invention. After the engine has started operating at a normal temperature which is relatively high, the engine temperature (sensed by the coolant temperature sensor 42) is increased as indicated by a line Ia in FIG. 9. In accordance with the increase of the engine temperature, the catalyst temperature is increased as indicated by a line IIa in FIG. 9. At this time, a first reference temperature THWX1 is determined by the CPU 60 by adding a relatively small temperature factor "a" to the engine temperature sensed at the start of the engine operation.

As indicated in FIG. 9, when the engine temperature indicated by the line Ia reaches the first reference temperature THWX1, the catalyst temperature indicated by the line IIa is approximately equal to the target catalyst temperature To. Since the catalyst of the EHC converter 41 is no longer heated by the controller 50 when the engine temperature reaches the first reference temperature THWX1, it is possible to achieve an efficient catalytic conversion of exhaust gas from the engine.

As indicated by "c" in FIG. 9, the execution flag is set to one when the engine starts operating, and the execution flag is reset to zero when the catalytic temperature reaches the target catalytic temperature To.

When the engine has started operating at a very low temperature, the engine temperature is increased as indicated by a line Ib in FIG. 9. In accordance with the increase of the engine temperature, the catalyst temperature is increased as indicated by a line IIb in FIG. 9. At this time, a second reference temperature THWX2 is determined by the CPU 60 by adding a relatively great temperature factor "a" to the engine temperature sensed at the start of the engine operation.

As indicated in FIG. 9, when the engine temperature indicated by the line Ib reaches the second reference temperature THWX2, the catalyst temperature indicated by the line IIb is approximately equal to the target catalyst temperature To. As indicated by "d" in FIG. 9, the execution flag is set to one when the engine starts operating, and the execution flag is reset to zero when the catalytic temperature reaches the target catalytic temperature To. Since the catalyst is no longer heated by the controller 50 when the engine temperature reaches the second reference temperature THWX2, it is possible to prevent the catalyst of the EHC converter 41 from being excessively heated by the controller 50. Also, it is possible to prevent the catalyst from deteriorating or being damaged by the excessive heat.

It should be noted that, in the catalyst heating control apparatus of the present invention, a time duration in which the catalyst of the EHC converter 41 is heated is adjusted to be a suitable time duration according to an operating condition of the engine. For example, when the engine is operating under a high load condition, it is desirable to release earlier the catalyst of the EHC converter 41 from being heated, since the catalyst temperature is rapidly increased under such a condition. When the engine is operating under a high load condition, the engine temperature is also rapidly increased. Thus, according to the present invention, the early releasing of the catalyst heating process can be realized.

Figure 10:
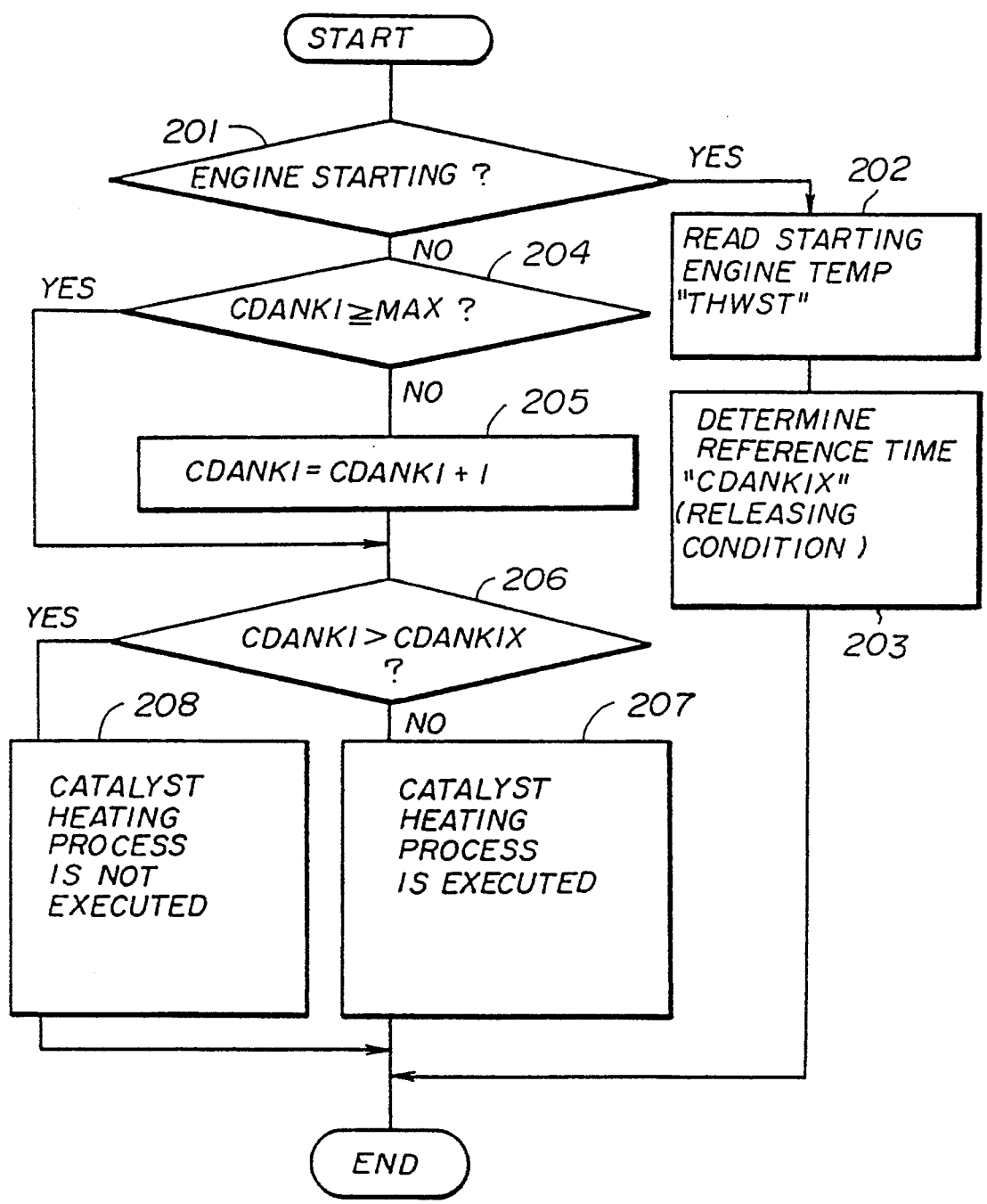
FIG. 10 is a flow diagram for explaining another procedure for determining a releasing condition based on an engine temperature at the start of the engine operation.

Next, a description will be given, with reference to FIGS. 10 and 11, of another releasing condition determining procedure according to the present invention. FIG. 10 shows the procedure for determining a releasing condition based on an engine temperature sensed at the start of the engine operation.

The procedure shown in FIG. 10 is repeatedly executed by the ECU 21 using an interrupt function at given time intervals (e.g., 1.0 second). When the releasing condition determining procedure in FIG. 10 is started, step 201 detects whether or not it is currently the time the engine starts operating. If the answer to step 201 is affirmative, step 202 reads a starting engine temperature THWST based on a signal indicating the engine temperature sensed at the start of the engine operation. These steps 201 and 202 are the same as the above steps 101 and 102 in FIG. 7.

After step 202 is performed, step 203 determines a reference time CDANKIX based on the engine temperature THWST. After step 203 is performed, the procedure in FIG. 7 is temporarily finished. The reference time CDANKIX determined in step 203 is a releasing condition on which a determination as to whether the catalyst is to be released from being heated by the controller 50 is based. A map defining the relationship between the starting engine temperature THWST and the reference time CDANKIX is stored in the ROM 61. In step 203, the CPU 60 retrieves a value of the reference time CDANKIX corresponding to a specific starting engine temperature THWST (obtained in step 202) from the ROM 61.

Figure 11:
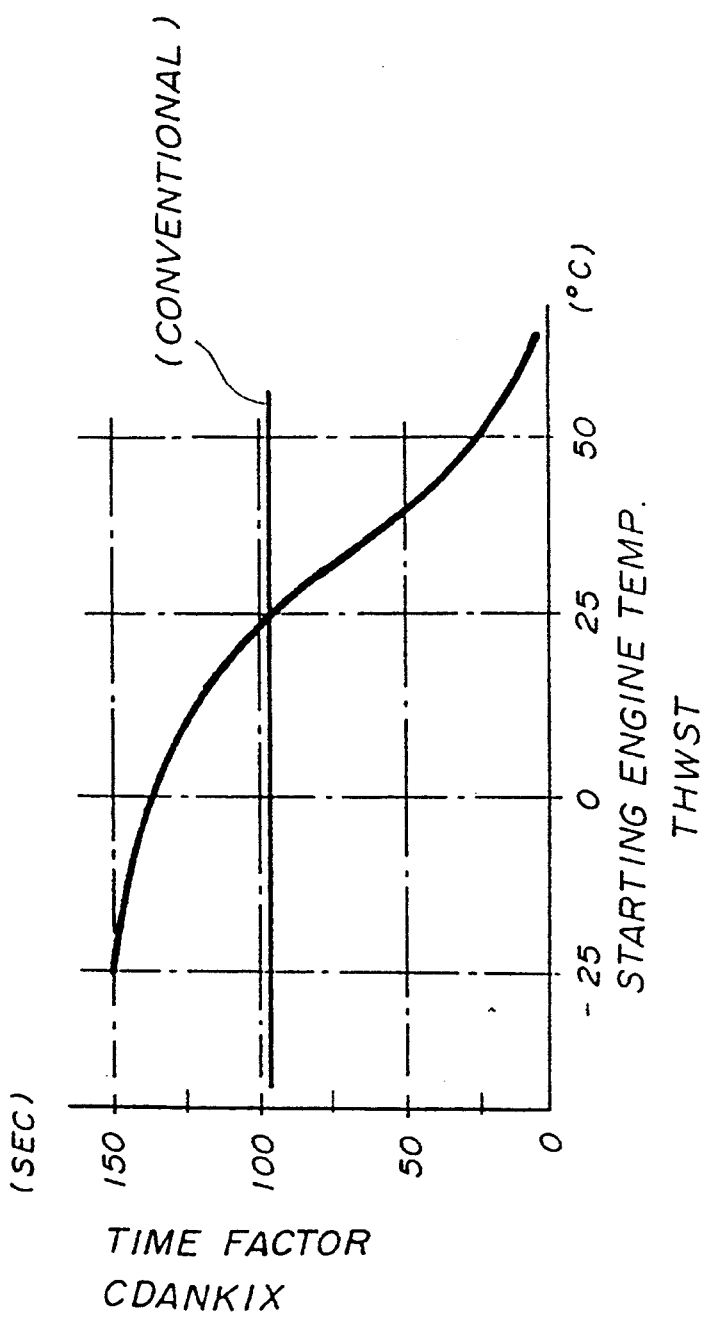
FIG. 11 is a chart showing the relationship between the starting engine temperature and the time factor used by the procedure in FIG. 10.

FIG. 11 shows the relationship between the starting engine temperature THWST and the time factor CDANKIX used by the catalyst heating control apparatus of the present invention. As indicated in FIG. 11, the value of the time factor CDANKIX corresponding to the starting engine temperature THWST is decreased in a non-linear manner in response to the increase of the starting engine temperature THWST. However, in a case of the conventional device as previously described, the time factor CDANKIX has a fixed value (e.g., 100 seconds) as indicated in FIG. 11, and this value remains unchanged no matter how the starting engine temperature THWST changes.

If step 201 detects that it is not currently the time the engine starts operating, step 204 detects whether or not an execution time CDANKI which is counted by the CPU 60 is greater than a maximum execution time. If the answer to step 204 is negative, step 205 is performed. In step 205, the CPU 60 increments the execution time CDANKI (CDANKI=CDANKI+1). After step 205 is performed, step 206 detects whether or not the execution time CDANKI determined in step 205 is greater than the reference time CDANKIX determined in step 203. On the other hand, if the answer to step 204 is affirmative (CDANKI≧MAX), step 206 is performed, and the step 205 is not performed.

If the answer to step 206 is negative (CDANKI≦CDANKIX), step 207 is performed. In step 207, the CPU 60 executes a catalyst heating process by setting the execution flag (used to allow the heating of the catalyst) to 1. The procedure in FIG. 10 is then finished. On the other hand, if the answer to step 206 is affirmative (CDANKI>CDANKIX), step 208 is performed. In step 208, the CPU 60 does not execute the catalyst heating process by resetting the execution flag to zero, so that the catalyst of the EHC converter 41 is no longer heated by the controller 50. The procedure in FIG. 7 is then finished.

In the procedure shown in FIG. 10, the releasing condition determined is satisfied when the execution time CDANKI determined in step 205 reaches the reference time CDANKIX determined in step 203. As indicated in FIG. 11, when the starting engine temperature is very low, the reference time CDANKIX is changed to a value that is greater than that when the starting engine temperature is relatively high. The time duration in which the catalyst is heated is made longer by the thus determined reference time CDANKIX when the starting engine temperature is very low. Hence, similarly to the procedure shown in FIG. 7, the catalyst of the EHC converter 41 is released from being heated by the controller 50 when the catalyst temperature reaches the target catalyst temperature To. Therefore, it is possible to prevent the catalyst from being excessively heated as in the conventional device. It is possible to prevent the fuel economy of the internal combustion engine from becoming worse when the engine started operating at a very low temperature.

Next, the ignition time delaying procedure to which the present invention is applied will be described with reference to FIGS. 12 and 13.

Figure 12:
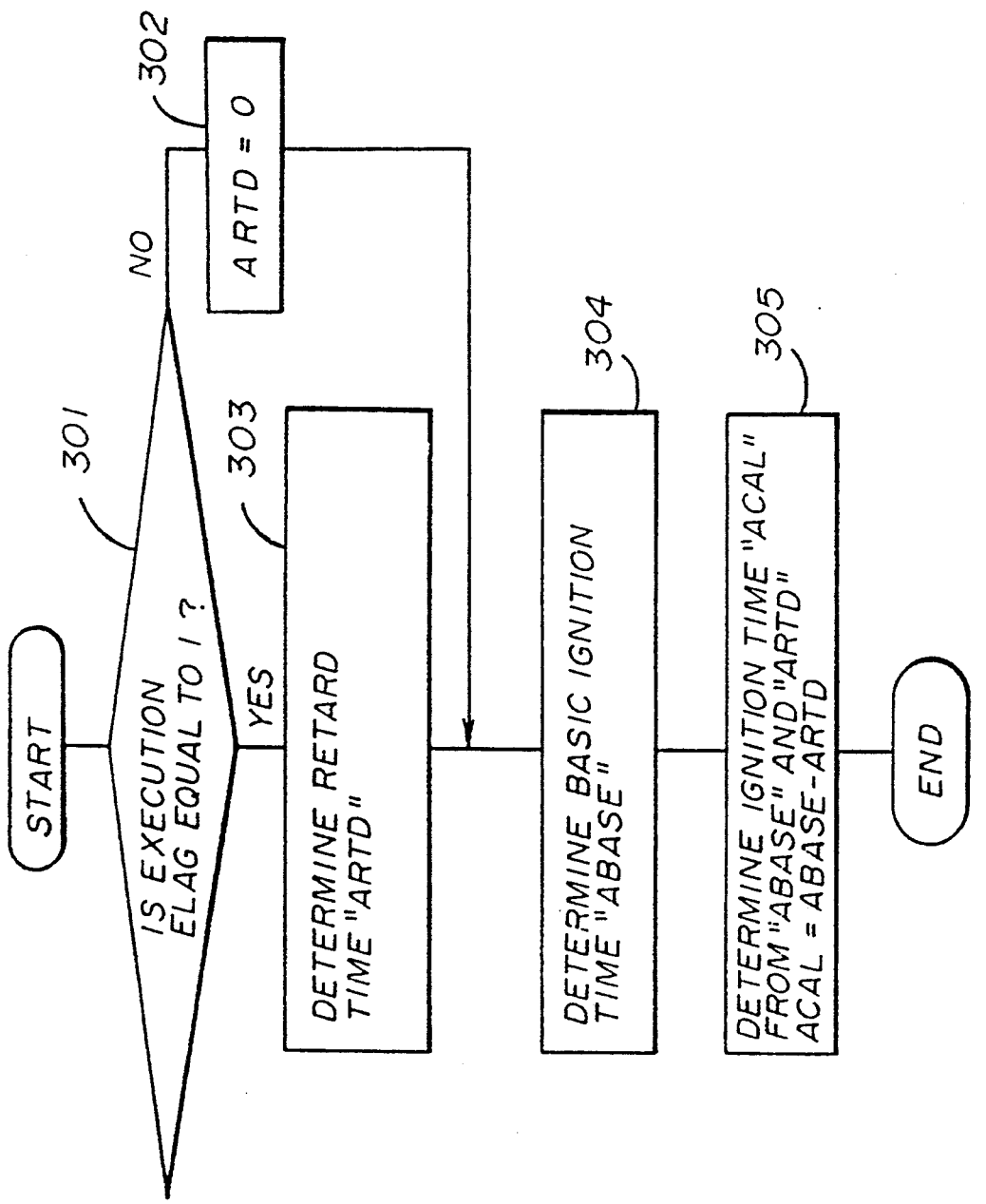
FIG. 12 is a flow diagram for explaining a procedure for determining an ignition time to control the ignition timing of the engine.
Figure 13:
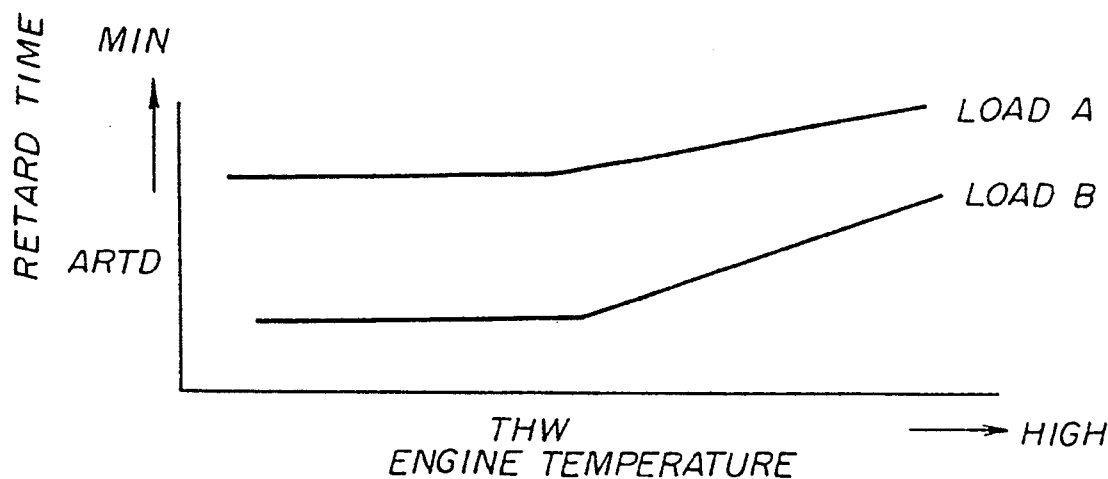
FIG. 13 is a chart showing the relationship between the engine load, the engine temperature and the retard time factor used by the procedure shown in FIG. 12.

FIG. 12 shows the procedure for determining a delayed ignition time of the spark valve 29 in FIG. 3 to control the ignition timing of the engine. In the procedure in FIG. 12, step 301 detects whether or not the execution flag (which is set in step 106 or step 207) is equal to 1. If the execution flag is not equal to 1 in step 301, the catalyst heating process according to the present invention is not allowed to be performed. Step 302 resets a retard time ARTD to zero (ARTD=0).

If the execution flag is equal to 1 in step 303, step 303 performs the catalyst heating process of the present invention. More specifically, in step 303, an engine load at this time is calculated based on an engine speed NE sensed by the rotation angle sensor 46 and based on an intake air flow rate sensed by the air flow meter 34. In step 303, the retard time ARTD is then determined based on the calculated engine load and an engine temperature THW sensed by the water temperature sensor 42. In step 303, this retard time ARTD is retrieved by the CPU 60 from the ROM 61. In step 303, a value of the retard time ARTD corresponding to a specific engine temperature THW and engine load is obtained from a map stored in the ROM 61. The map stored in the ROM 61 defines the relationship between the engine load, the engine temperature and the retard time factor as shown in FIG. 13.

After either step 302 or step 303 is performed, step 304 determines a basic ignition time ABASE based on the engine speed NE sensed by the rotation angle sensor 46 and based on the engine load obtained as in step 303. Step 305 determines an ignition time ACAL by subtracting the retard time ARTD obtained in step 302 or 303 from the basic ignition time ABASE obtained in step 304 (ACAL=ABASE−ARTD. The procedure in FIG. 12 is then finished.

Accordingly, the ECU 21 supplies a control signal based on the ignition time ACAL to the igniter 43. A high voltage produced by the igniter 43 is supplied to the spark plug 29 at the time which is delayed from the basic ignition time ABASE by the retard time ARTD. Since the spark ignition in the combustion chamber 24 of the engine is thus performed by the spark plug 29, the exhaust gas temperature becomes higher than corresponding exhaust gas temperature when the ignition time is not delayed, and it is possible that the catalyst of the EHC converter 41 be rapidly heated by the exhaust gas from the engine.

Figure 14:
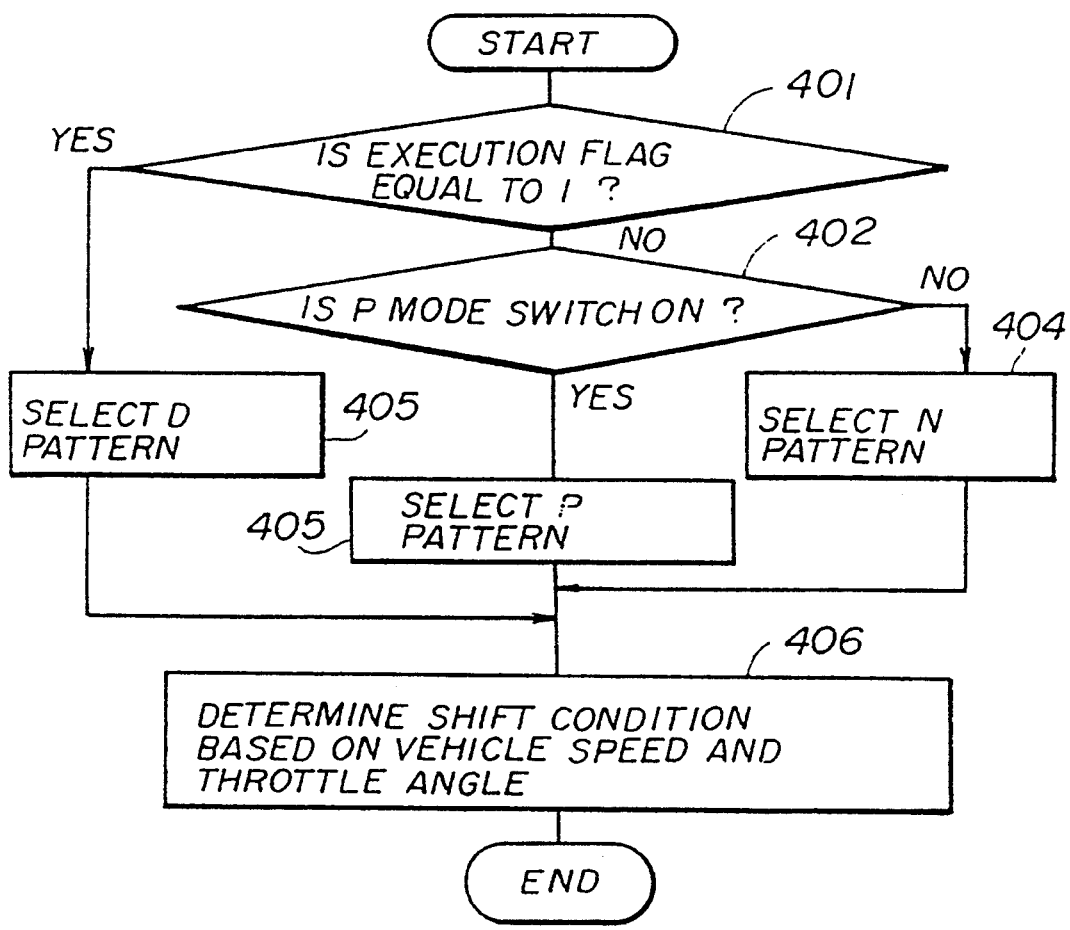
FIG. 14 is a flow diagram for explaining a procedure for selecting a shift condition of an automatic transmission of the system in FIG. 3.

Next, the shift condition selecting procedure to which the present invention is applied will be described with reference to FIGS. 14 and 15. FIG. 14 shows the procedure for selecting a shift condition of the automatic transmission 48 of the system in FIG. 3. This procedure in FIG. 14 is executed by the ECT computer 47 in FIG. 3.

In the procedure in FIG. 14, step 401 detects whether the execution flag (which is set in step 106 or step 207) is equal to 1. If the execution flag is not equal to 1 in step 401, the catalyst heating process according to the present invention is not performed. Step 402 detects whether or not a P-mode (power mode) switch is turned on. If the answer to step 402 is negative (the P-mode switch is off), step 404 selects an N-pattern (normal pattern) shift condition of the automatic transmission 48. If the answer to step 402 is affirmative (the P-mode switch is on), step 405 selects a P-pattern (power pattern) shift condition of the automatic transmission 48.

Figure 15:
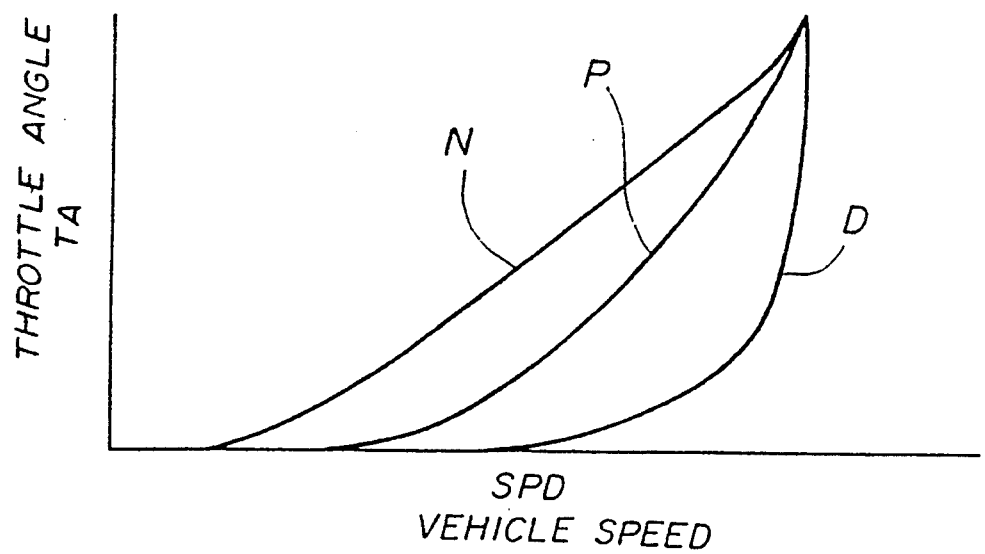
FIG. 15 is a chart showing some shift patterns of the automatic transmission used by the shift condition selecting procedure in FIG. 14 to select a shift condition.

FIG. 15 shows some shift patterns for determining a shift condition of the automatic transmission 48 used by the shift condition selecting procedure in FIG. 14. In FIG. 15, "N" and "P" respectively indicate an N-pattern shift condition and P-pattern shift condition of the automatic transmission 48, both conditions being defined relating to the relationship between the vehicle speed SPD and the throttle angle TA. As indicated in FIG. 15, a vehicle speed SPD corresponding to a certain throttle angle TA when the N-pattern shift condition is selected is lower than a vehicle speed SPD corresponding to the same throttle angle TA when the P-pattern shift condition is selected.

If the answer to step 401 is affirmative (the execution flag is equal to 1), step 403 selects a D-pattern (the catalyst heating pattern) shift condition of the automatic transmission 48. When the D-pattern shift condition is selected, the catalyst heating process of the present invention described above is performed. As indicated in FIG. 15, a vehicle speed SPD corresponding to a certain throttle angle TA when the D-pattern shift condition is selected is the highest among the vehicle speeds of the other pattern shift condition curves.

After any of the above steps 403 through 405 is performed, step 406 determines a shift condition of the selected pattern shift condition curve based on the vehicle speed SPD and the throttle angle TA. The ECT computer 47 controls the shifting operation of the automatic transmission 48 in accordance with the shift condition determined in step 406. Since the shifting operation of the automatic transmission 48 is performed at a higher vehicle speed when the catalyst heating pattern is selected, the exhaust gas temperature is higher than corresponding exhaust gas temperatures when the other patterns (including the N-pattern and the P-pattern) are selected. Thus, it is possible that the catalyst of the EHC converter 41 be rapidly heated by the exhaust gas from the engine.

Figure 16:
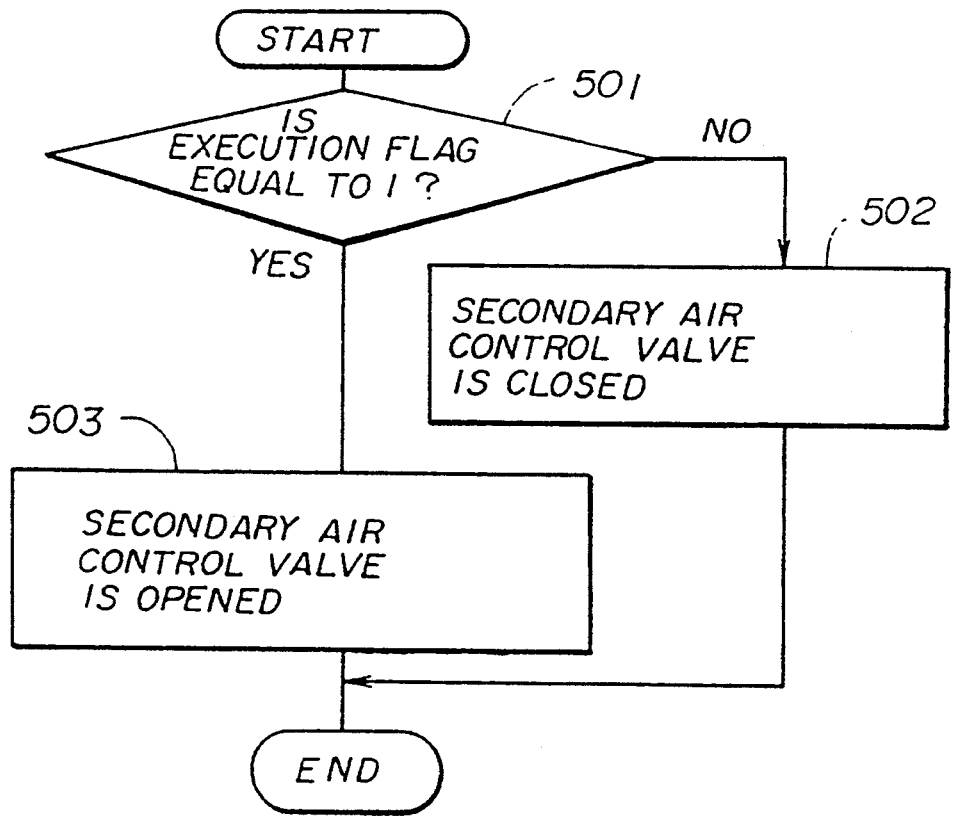
FIG. 16 is a flow diagram for explaining a procedure for controlling the operation of a secondary air control valve of the system in FIG. 3.

Next, the secondary air control valve on/off procedure to which the present invention is applied will be described with reference to FIG. 16. FIG. 16 shows the procedure for controlling the operation of the secondary air control valve 37 of the system in FIG. 3.

In the procedure in FIG. 16, step 501 detects whether the execution flag (which is set in step 106 or step 207) is equal to 1. If the execution flag is not equal to 1 in step 501, the catalyst heating process according to the present invention is not performed. The ECU 21 switches off the secondary air control valve 37 in step 502, so that no secondary air is supplied to the exhaust manifold 28.

On the other hand, if the execution flag is equal to 1 in step 501, the catalyst heating process of the present invention is performed. The ECU 21 switches on the secondary air control valve 37 in step 503, so that part of intake air passing through the air cleaner 30 is supplied from the valve 37 to the exhaust manifold 28 via the air passage 38. Since the additional air is mixed with the exhaust gas from the combustion chamber 24 of the engine, unburned component gas (such as carbon monoxide and hydrocarbon) of the exhaust gas is subjected to the re-combustion in the exhaust manifold 28, thereby increasing the exhaust gas temperature to a higher temperature. Thus, it is possible to promote the heating of the catalyst of the EHC converter 41 by the heat of the exhaust gas from the engine.

Figure 17:
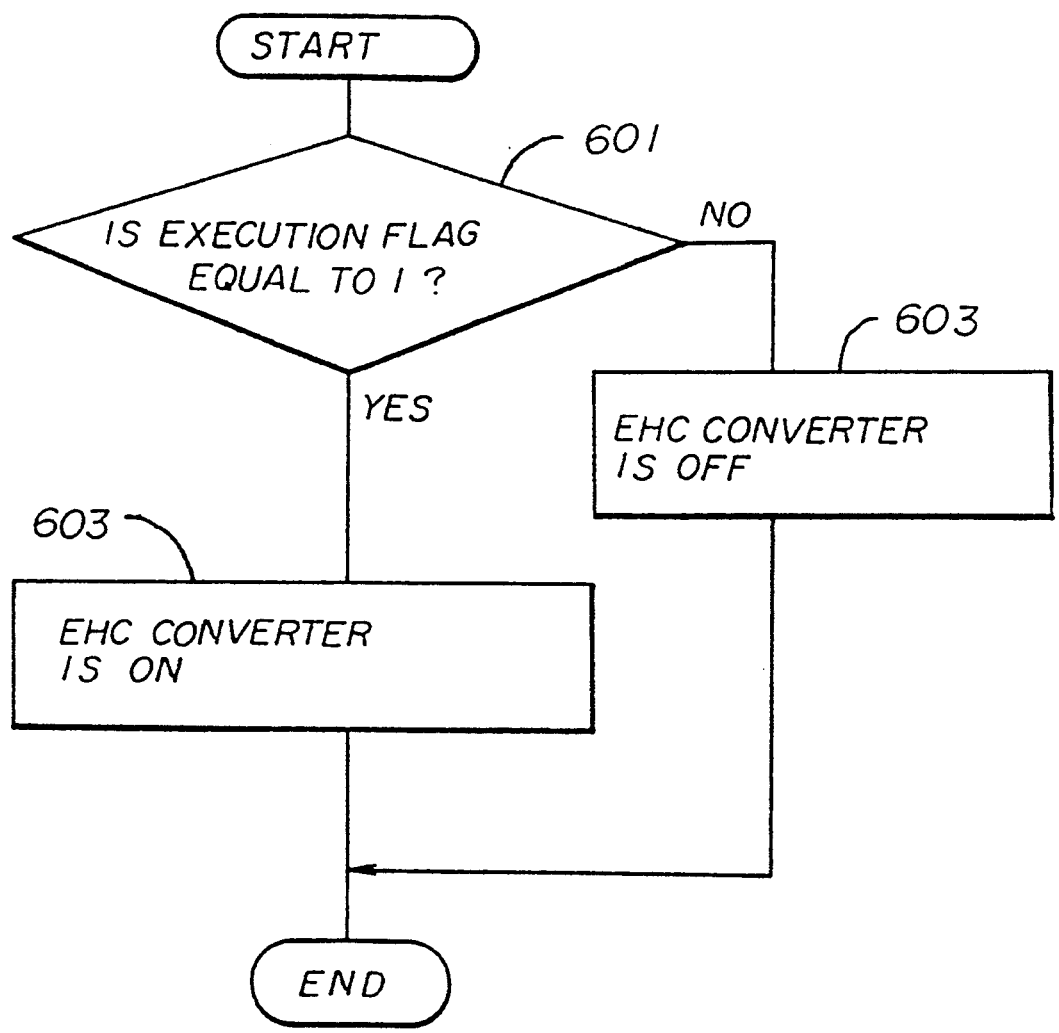
FIG. 17 is a flow diagram for explaining a procedure for controlling the operation of an electrically heatable catalytic converter of the system in FIG. 3.

Next, the EHC converter on/off procedure to which the present invention is applied will be described with reference to FIG. 17. FIG. 17 shows the procedure for controlling the operation of the electrically heatable catalytic (EHC) converter 41 of the system in FIG. 3.

In the procedure in FIG. 17, step 601 detects whether the execution flag (which is set in step 106 or step 207) is equal to 1. If the execution flag is equal to 1 in step 601, step 602 switches on the EHC converter 41. More specifically, in step 602, the ECU 21 supplies a control signal having a given level and time duration to the controller 50, and the controller 50 heats the catalyst 53 of the EHC converter 41 by applying electric voltage between the electrodes 57 and 58 of the EHC converter 41. As the catalyst 53 of the EHC converter 41 is heated, the temperature of the catalyst 52 is increased by the exhaust gas heated by the catalyst 53. After step 602 is performed, the procedure in FIG. 17 is finished.

As described above, the catalyst temperature relating to the catalytic converter is increased by making the time duration in which electric current is supplied to the EHC converter 41 longer. However, the exhaust gas temperature changes in different manners depending on the operating condition of the engine. If the time duration of electric current supplied to the EHC converter 41 remains unchanged, the exhaust gas temperature changes to a different temperature when the engine is operating under a different operating condition. Therefore, it is desirable to adjust the time duration of electric current supplied to the EHC converter 41 to a time duration according to the operating condition of the engine.

If the execution flag is not equal to 1 in step 601, step 603 switches off the EHC converter 41 so that the catalyst of the EHC converter 41 is not heated. The procedure in FIG. 17 is then finished.

According to the present invention, a releasing condition which determines how the catalyst is released from the heating is calculated based on the engine temperature sensed at the start of the engine operation, and the actual catalyst temperature at this time is correctly predicted. Thus, the catalyst is heated in a manner appropriate for efficient catalytic conversion of exhaust gas when the engine starts operating under a cold start condition. Hence, it is possible to prevent the catalyst of the catalytic converter from being excessively heated or damaged, and it is possible to prevent the fuel economy from becoming worse when the engine starts operating under a cold start condition.

Further, the present invention is not limited to the above described embodiments, and variations and modifications may be made without departing from the scope of the present invention.

What is claimed is:

1. An apparatus for controlling heating of a catalytic converter of an internal combustion engine, comprising:
   a catalytic converter arranged in an exhaust passage of the engine;
   heating means for heating a catalyst of said catalytic converter after the engine has started operating, so as to promote catalytic conversion of exhaust gas from the engine;
   detecting means for sensing a temperature of engine coolant at the start of operation of the engine;
   calculating means for determining a releasing condition based on the engine coolant temperature sensed by said detecting means at the start of the engine operation; and
   stopping means for stopping the heating means from heating the catalyst when said releasing condition is met.

2. An apparatus according to claim 1, wherein said calculating means varies the releasing condition depending on at least one operating condition of the engine.

3. An apparatus according to claim 1, wherein said heating means comprises a controller connected to an electronic control unit of the engine, said catalytic converter is an electrically heatable catalytic converter having an electrode connected to said controller, and the catalyst of the catalytic converter is heated by said controller in accordance with a signal supplied from said electronic control unit.

4. An apparatus according to claim 1, wherein said releasing condition is a reference temperature that varies based on the engine coolant temperature sensed by said detecting means at the start of the engine operation.

5. An apparatus according to claim 4, wherein said stopping means stops the catalyst from being heated by said heating means when the engine coolant temperature sensed by said detecting means becomes higher than the reference temperature determined by said calculating means.

6. An apparatus according to claim 1, wherein said releasing condition is an execution time that varies based on the engine coolant temperature sensed by said detecting means at the start of the engine operation.

7. An apparatus according to claim 1, wherein said stopping means allows said heating means to heat the catalyst of the catalytic converter when said stopping means detects that said releasing condition is not met.

8. An apparatus according to claim 1, further comprising flag setting means for setting an execution flag to a value of one when an operating condition of the engine satisfies said releasing condition, and for resetting the execution flag to a value of zero when an operating condition of the engine does not satisfy said releasing condition.

9. An apparatus according to claim 8, further comprising ignition time means for determining a delayed ignition time based on the engine coolant temperature and an engine load when the flag setting means sets the execution flag to one, the delayed ignition time controlling an ignition time of the engine when the catalyst is heated by the heating means.

10. An apparatus according to claim 8, further comprising shift condition means for selecting a shift condition based on a vehicle speed and a throttle angle when the execution flag is set to one by said flag setting means, said shift condition controlling a shift timing of an automatic transmission when the catalyst is heated by the heating means.

11. An apparatus according to claim 8, further comprising secondary air means for switching on and off a secondary air control valve arranged at an inlet portion of an intake passage of the engine in accordance with the value of the execution flag set by said flag setting means, said secondary air control valve being connected to an exhaust passage of the engine via an air passage, said secondary air control valve being switched on when the catalyst is heated by the heating means.

* * * * *